United States Patent
Inoue

(10) Patent No.: US 8,223,218 B2
(45) Date of Patent: Jul. 17, 2012

(54) FACE DETECTION APPARATUS

(75) Inventor: Akihiko Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/864,949

(22) PCT Filed: Dec. 1, 2009

(86) PCT No.: PCT/JP2009/006501
§ 371 (c)(1),
(2), (4) Date: Jul. 28, 2010

(87) PCT Pub. No.: WO2010/064405
PCT Pub. Date: Jun. 10, 2010

(65) Prior Publication Data
US 2011/0228117 A1  Sep. 22, 2011

(30) Foreign Application Priority Data

Dec. 5, 2008 (JP) .................. 2008-310631

(51) Int. Cl.
*H04N 5/228* (2006.01)
*H04N 5/225* (2006.01)
*G06K 9/00* (2006.01)
(52) U.S. Cl. ............. 348/222.1; 348/169; 382/118
(58) Field of Classification Search ......... 348/222.1, 348/129, 169; 382/103, 115–118, 181, 190
See application file for complete search history.

(56) References Cited

U.S. PATENT DOCUMENTS

| 7,227,976 | B1* | 6/2007 | Jung et al. ............... 382/103 |
| 7,809,162 | B2* | 10/2010 | Steinberg et al. ........ 382/103 |
| 7,948,524 | B2* | 5/2011 | Endo et al. ............. 348/222.1 |
| 8,005,265 | B2* | 8/2011 | Steinberg et al. ........ 382/103 |
| 8,019,128 | B2* | 9/2011 | Oosaki ................. 382/118 |
| 8,077,216 | B2* | 12/2011 | Ishihara ............... 348/222.1 |
| 8,111,881 | B2* | 2/2012 | Imamura ............... 382/118 |
| 8,149,280 | B2* | 4/2012 | Yoda ................. 348/207.1 |
| 2004/0170326 | A1 | 9/2004 | Kataoka et al. |
| 2006/0271525 | A1 | 11/2006 | Sukegawa |
| 2009/0303342 | A1* | 12/2009 | Corcoran et al. ......... 348/222.1 |
| 2012/0062761 | A1* | 3/2012 | Ianculescu et al. ........ 348/222.1 |

FOREIGN PATENT DOCUMENTS

| JP | 2001-14463 | 1/2001 |
| JP | 2004-227519 | 8/2004 |
| JP | 2005-99953 | 4/2005 |

(Continued)

OTHER PUBLICATIONS

International Search Report issued Dec. 28, 2009 in corresponding International Application No. PCT/JP2009/006501.

*Primary Examiner* — Kelly L Jerabek
(74) *Attorney, Agent, or Firm* — Wenderoth, Lind & Ponack, L.L.P.

(57) ABSTRACT

A face detection apparatus of the present invention includes a face detection apparatus for detecting a face contained in an input image, including: a face detection section for detecting a face contained in the input image, based on a predetermined frame rate and face detection throughput per frame; and an accuracy changing section for changing, when no face is detected by the face detection section, the accuracy in detecting a face by the face detection section by reducing the frame rate.

14 Claims, 12 Drawing Sheets

FOREIGN PATENT DOCUMENTS

| | | |
|---|---|---|
| JP | 2006-228061 | 8/2006 |
| JP | 2006-301847 | 11/2006 |
| JP | 2006-331091 | 12/2006 |
| JP | 2007-13774 | 1/2007 |
| JP | 2007-156541 | 6/2007 |
| JP | 2009-75999 | 4/2009 |

* cited by examiner

FIG. 6

ACCURACY CHANGE HISTORY

| FREQUENCY OF FACE DETECTION PROCESS | N VALUE | CONDITIONS OF FACE DETECTION PROCESS |
|---|---|---|
| 1 | 1 | FRAME RATE = 30fps<br>DETECTION AREA = ENTIRE SCREEN 500 |
| 2 | 1 | FRAME RATE = 30fps<br>DETECTION AREA = ENTIRE SCREEN 500 |
| 3 | 2 | FRAME RATE = 60fps<br>DETECTION AREA = UPPER AREA 501 |
| 4 | 3 | FRAME RATE = 90fps<br>DETECTION AREA = UPPER AREA 503 |
| 5 | 4 | FRAME RATE = 120fps<br>DETECTION AREA = UPPER-LEFT AREA 505 |
| 6 | 3 | FRAME RATE = 90fps<br>DETECTION AREA = UPPER AREA 503 |
| 7 | 4 | FRAME RATE = 120fps<br>DETECTION AREA = UPPER-LEFT AREA 505 |
| ⋮ | ⋮ | ⋮ |

FIG. 7A

METHOD OF THINNING THE PROCESS IN TIME-AXIS DIRECTION

| # | LIMITATION TYPE | LIMITATION METHOD | REDUCTION RATE OF FACE DETECTION THROUGHPUT | PRIORITY |
|---|---|---|---|---|
| 1 | REGULAR INTERVAL | | A% | 1 |
| 2 | PICTURE TYPE | I PICTURE | B% | 2 |
| 3 | | P PICTURE | C% | 3 |
| 4 | | B PICTURE | D% | 4 |
| ⋮ | ⋮ | ⋮ | ⋮ | ⋮ |

F I G. 7 B

METHOD OF THINNING THE PROCESS IN SPACE-AXIS DIRECTION

| # | LIMITATION TYPE | LIMITATION METHOD | REDUCTION RATE OF FACE DETECTION THROUGHPUT | PRIORITY |
|---|---|---|---|---|
| 1 | AREA | UPPER/LOWER | A% | 1 |
| 2 | | LEFT/RIGHT | B% | 3 |
| 3 | FACE ORIENTATION | FRONTAL | C% | 2 |
| 4 | | LEFT-ORIENTED | D% | 7 |
| 5 | | RIGHT-ORIENTED | E% | 8 |
| 6 | FACE SIZE | RESOLUTION ID$\geq$6 | F% | 4 |
| 7 | | RESOLUTION ID$\geq$4 | G% | 5 |
| 8 | | RESOLUTION ID$\geq$2 | H% | 6 |
| ⋮ | ⋮ | ⋮ | ⋮ | ⋮ |

DIGITAL STILL CAMERA 800

F I G. 1 0   PRIOR ART
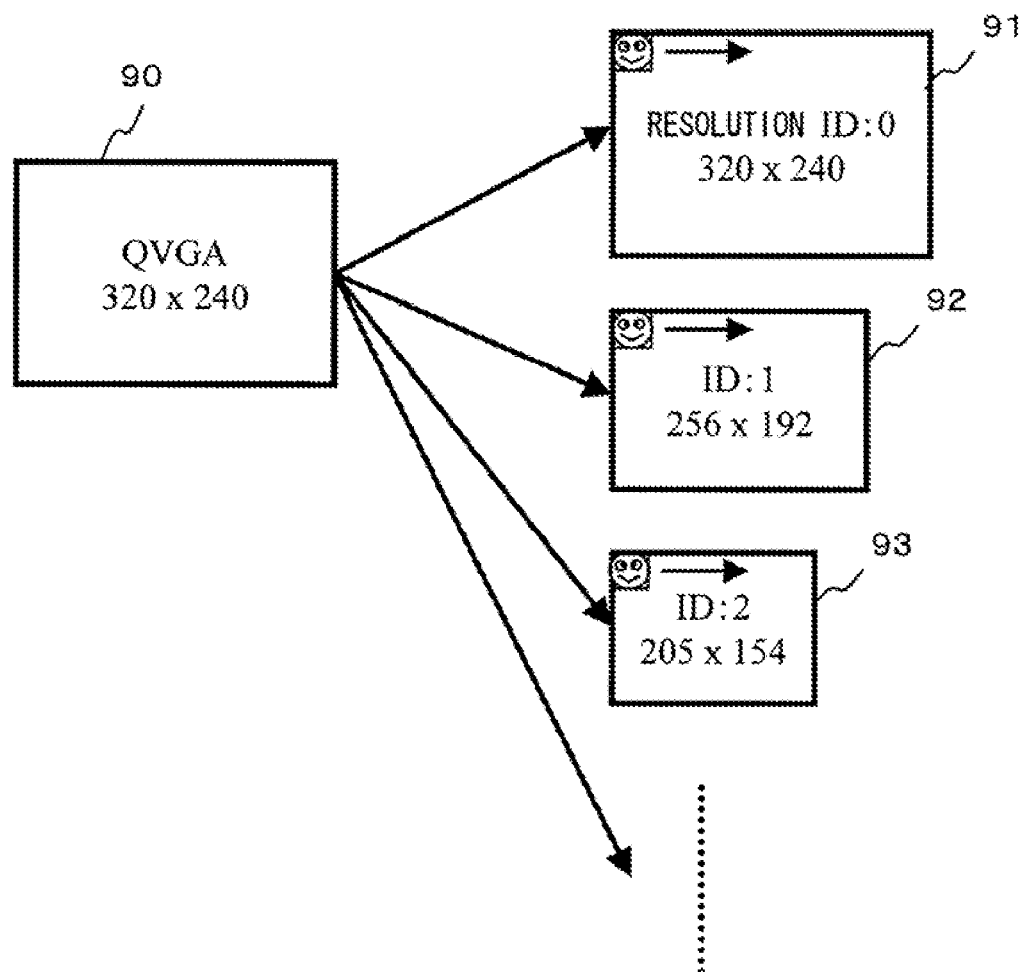

F I G. 1 1   PRIOR ART

| RESOLUTION ID | HORIZONTAL WIDTH [PIXEL] | VERTICAL WIDTH [PIXEL] | GENERATING METHOD |
|---|---|---|---|
| 0 | 320 | 240 | MULTIPLY QVGA BY (1/1.25)^0-FOLD |
| 1 | 256 | 192 | MULTIPLY QVGA BY (1/1.25)^1-FOLD |
| 2 | 205 | 154 | MULTIPLY QVGA BY (1/1.25)^2-FOLD |
| 3 | 164 | 124 | MULTIPLY QVGA BY (1/1.25)^3-FOLD |
| 4 | 132 | 100 | MULTIPLY QVGA BY (1/1.25)^4-FOLD |
| 5 | 106 | 80 | MULTIPLY QVGA BY (1/1.25)^5-FOLD |
| 6 | 85 | 64 | MULTIPLY QVGA BY (1/1.25)^6-FOLD |
| 7 | 68 | 52 | MULTIPLY QVGA BY (1/1.25)^7-FOLD |
| 8 | 55 | 42 | MULTIPLY QVGA BY (1/1.25)^8-FOLD |
| 9 | 44 | 34 | MULTIPLY QVGA BY (1/1.25)^9-FOLD |
| 10 | 36 | 28 | MULTIPLY QVGA BY (1/1.25)^10-FOLD |
| 11 | 29 | 23 | MULTIPLY QVGA BY (1/1.25)^11-FOLD |

FACE DETECTION APPARATUS

TECHNICAL FIELD

The present invention relates to a face detection apparatus for detecting a face area contained in image data, and more particularly, to a face detection apparatus for detecting the face area, with low power consumption and high efficiency.

BACKGROUND ART

There has conventionally been a technology for detecting a face area contained in image data captured by, for example, a digital camera. In general, when detecting a face area contained in image data, a matching process is performed with a prepared face template to detect the face contained in the image data.

Furthermore, a method has been proposed in which, when a plurality of faces of different sizes are present in image data to be a target of a face detection process, the resolution of the image data or the resolution of the prepared face template is changed in stepwise fashion to detect the plurality of faces of different sizes contained in the image data (for example, Patent Literature 1).

FIG. 10 is a conceptual diagram showing a face detection process in a general face detection apparatus. In FIG. 10, the face detection apparatus performs the face detection process on an input image 90 having a QVGA (Quarter Video Graphics Array) resolution. In order to detect a plurality of faces of different sizes contained in the input image 90, images having different resolutions are generated, based on the input image 90, in accordance with preset resolutions. Here, when generating the images having different resolutions, the input image 90 is reduced by 20% in stepwise fashion as shown in the following Mathematical Formula 1 to generate images 91, 92, 93 . . . having the respective resolutions.

$$(1/1.25)^n \qquad (1)$$

where n denotes a resolution ID indicating a reducing phase of the input image 90. A reduction rate of the input image 90 increases with an increase in the resolution ID. Since the input image 90 has the QVGA resolution (horizontally 320 pixels× vertically 240 pixels), the image 91 where the resolution ID=0 is equivalent to the QVGA resolution image. Next, an image where the resolution ID=1 is the image 92 (horizontally 256 pixels×vertically 192 pixels) that has 1/1.25th of the QVGA resolution, i.e., that has the reduction rate of 80% relative to the QVGA resolution image. Similarly, an image where the resolution ID=2 is the image 93 (horizontally 205 pixels×vertically 154 pixels) that has the reduction rate of 64% relative to the QVGA resolution image.

FIG. 11 is a diagram showing the relation between the resolution and the number of pixels in images to be generated having the respective resolutions. More specifically, FIG. 11 shows the relation between the resolution IDs which are obtained when the QVGA resolution image is reduced by 20% in stepwise fashion based on the aforementioned Mathematical Formula 1 to generate images having different resolutions, and the number of vertical and horizontal pixels in the images to be generated having the respective resolutions.

Here, when the matching process is performed by using, for example, a face template having horizontally 20 pixels× vertically 20 pixels, images are generated having the resolutions ranging from the resolution ID=0 to the resolution ID=11, which are obtained by reducing the QVGA resolution image by 20% in stepwise fashion, as shown in FIG. 11. Because the minimum resolution (the resolution ID=11) is horizontally 29 pixels×vertically 23 pixels, if the image is reduced any further, matching with the face template having horizontally 20 pixels×vertically 20 pixels cannot be performed. Therefore, the resolution ID ranges from 0 to 11. The phases of the resolution IDs are thus determined based on the size of the prepared face template.

In the above example of the conventional technology, by reducing the input image 90 by a predetermined reduction rate in stepwise fashion, the images 91, 92, 93 . . . having different resolutions are generated based on the input image 90. Subsequently, in order from an image having the largest reduction rate (resolution ID=11) toward an image having the small reduction rate (resolution ID=0), images to be the target of the face detection process are selected, and a portion of each selected image is clipped and matched with the prepared face template. That is, the face detection process is performed in stepwise fashion on the images from the smallest image towards the large image, thereby detecting a plurality of faces of different sizes contained in the input image 90 in order from the largest face.

In recent years, a camera system capable of high speed shooting has been proposed. The camera system allows photographs to be taken at over 300 frames per second and, consequently, a decisive moment can be captured. In order to detect, with high accuracy, a face in an image captured by the camera system, preferably the face detection process as described above is performed on all frames of image data captured at 300 frames per second. However, the requisite throughput for the face detection process undesirably increases in proportion to the number of frames to which the face detection process is applied.

In consumer electronics of recent years, reduction in power consumption has been highly desired. In general, throughput of equipment is proportional to its power consumption. Thus it is essential to reduce the requisite throughput for the face detection process while maintaining the accuracy of the face detection.

For example, Patent Literature 2 has proposed a method of reducing the amount of computations and shortening the processing time, per frame image, while maintaining the accuracy in detecting a subject in the frame image. In Patent Literature 2, a valid frame rate is logically obtained and a detection range is limited, in accordance with the size of the detection subject and a vehicle speed, thereby avoiding useless processes. The method takes advantage of a property that a small subject seen in the distance does not rapidly change in its size when being approached. That is, when detecting a small subject, the detection accuracy can be maintained even when the frame rate of the detection subject is reduced.

Also, for example, Patent Literature 3 has proposed a method of changing recognition conditions in response to that a specific face to be a target of recognition is recognized. In Patent Literature 3, when a specific face to be a target of recognition is recognized, the recognition conditions are changed at the time point, thereby performing the subsequent recognition processes at a high speed, without reducing the accuracy of the face recognition.

CITATION LIST

Patent Literature

[Patent Literature 1] Japanese Laid-Open Patent Publication No. 2006-301847 (FIG. 8, FIG. 9)

[Patent Literature 2] Japanese Laid-Open Patent Publication No. 2007-13774

[Patent Literature 3] Japanese Laid-Open Patent Publication No. 2009-075999

SUMMARY OF INVENTION

Technical Problem

The configuration proposed in Patent Literature 2, however, is based on an assumption that a photographer approaches the subject at a certain speed. Therefore, this configuration cannot be applied to a general shooting scene using a digital still camera, a video camera, or the like. That is, in order to maintain the accuracy of the face detection, it is necessary to perform the face detection process on all frames of captured image data. Consequently, the configuration is incapable of reducing the requisite throughput for the face detection process.

Although the configuration proposed in Patent Literature 3 is concerned with a high-speed face recognition process within the context of keeping the accuracy of the face recognition from reducing, the high-speed face recognition process may not be realized when the face recognition is performed using a frame rate which is higher than assumed. That is, the configuration does not consider a property that the accuracy of the face recognition conflicts with the speed of the face recognition, and fails to provide a structure which controls, by actively using this property, the accuracy of the face recognition in order to secure the high-speed face recognition process.

Accordingly, an object of the present invention is to provide a face detection apparatus for detecting a face area contained in image data, with low power consumption and high efficiency, by reducing the requisite throughput for the face detection process while maintaining the accuracy of the face detection, regardless of a shooting scene and a frame rate.

Solution to Problem

In order to achieve the above object, the face detection apparatus of the present invention includes a face detection apparatus for detecting a face contained in an input image, including: a face detection section for detecting a face contained in the input image, based on a predetermined frame rate and face detection throughput per frame; and an accuracy changing section for changing, when no face is detected by the face detection section, the accuracy in detecting a face by the face detection section by reducing the frame rate.

Preferably, when a face is detected by the face detection section, the accuracy changing section changes the accuracy in detecting a face by the face detection section by reducing the face detection throughput per frame.

More preferably, the face detection apparatus of the present invention further includes a storage section for storing, when a face is detected by the face detection section, as accuracy change history, the accuracy in detecting a face by the face detection section, the accuracy to be changed by the accuracy changing section, and, when no face is detected by the face detection section, the accuracy changing section changes the accuracy in detecting a face by the face detection section based on the accuracy change history stored in the storage section.

More preferably, when no face is detected by the face detection section, the accuracy changing section changes the accuracy in detecting a face by the face detection section based on the accuracy change history stored in the storage section, to an accuracy at which a face has been most recently detected by the face detection section.

Preferably, when no face is detected by the face detection section, the accuracy changing section reduces the frame rate and increases the face detection throughput per frame, and, when a face is detected by the face detection section, the accuracy changing section reduces the face detection throughput per frame and increases the frame rate.

More preferably, the accuracy changing section changes the accuracy in detecting a face by the face detection section so as to keep constant the entire face detection throughput by the face detection section.

Preferably, when no face is detected by the face detection section, a frame to be a target of the face detection by the face detection section is selected at a regular interval from among all frames of the input image.

When no face is detected by the face detection section, a frame to be the target of the face detection by the face detection section is a frame having a specific picture type selected from among all frames of the input image.

More preferably, when no face is detected by the face detection section, a frame to be the target of the face detection by the face detection section is selected in accordance with a preset priority order.

Preferably, when a face is detected by the face detection section, a face detection range to be the target of the face detection is limited in the frame to be the target of the face detection by the face detection section.

When a face is detected by the face detection section, the size of a face to be the target of the face detection is limited in the frame to be the target of the face detection by the face detection section.

Alternatively, when a face is detected by the face detection section, an orientation of a face to be the target of the face detection is limited in the frame to be the target of the face detection by the face detection section.

More preferably, when a face is detected by the face detection section, the target of the face detection is limited in accordance with the preset priority, in the frame to be the target of the face detection by the face detection section.

In order to achieve the above objects, a face detection method of the present invention includes a face detection method for detecting a face contained in an input image, which is executed by the face detection apparatus, the face detection method including: a face detection step for detecting a face contained in the input image, based on a predetermined frame rate and face detection throughput per frame; and, when no face is detected by the face detection step, an accuracy changing step for changing the accuracy in detecting a face by the face detection step by reducing the frame rate.

In order to achieve the above objects, an integrated circuit used in the face detection apparatus of the present invention includes an integrated circuit used in the face detection apparatus for detecting a face contained in an input image, including: a face detection section for detecting a face contained in the input image, based on a predetermined frame rate and face detection throughput per frame; and an accuracy changing section for changing, when no face is detected by the face detection section, the accuracy in detecting a face by the face detection section by reducing the frame rate.

The face detection method that is executed by the face detection apparatus or the integrated circuit used in the face detection apparatus may be provided in the form of a program causing a computer to execute the processing steps. This program may be introduced into the computer in the form of being stored in a computer-readable recording medium.

Advantageous Effects of Invention

As described above, the present invention is capable of realizing a face detection apparatus for detecting, with low power consumption and high efficiency, a face area contained in image data by reducing the requisite throughput for the face detection process while maintaining the accuracy of the face detection, regardless of a shooting scene and a frame rate.

BRIEF DESCRIPTION OF DRAWINGS

FIG. 6 is a diagram showing accuracy change history in a face detection process.

FIG. 7A is a diagram showing reduction rates of face detection throughput and priorities, with respect to a method of thinning the process in a time-axis direction.

FIG. 7B is a diagram showing the reduction rates of the face detection throughput and the priorities, with respect to a method of thinning the process in a space-axis direction.

FIG. 10 is a conceptual diagram showing the face detection process in a general face detection apparatus.

FIG. 11 is a diagram showing relations between resolution and the number of pixels in images to be generated having the respective resolutions.

DESCRIPTION OF EMBODIMENTS

Figure 1:
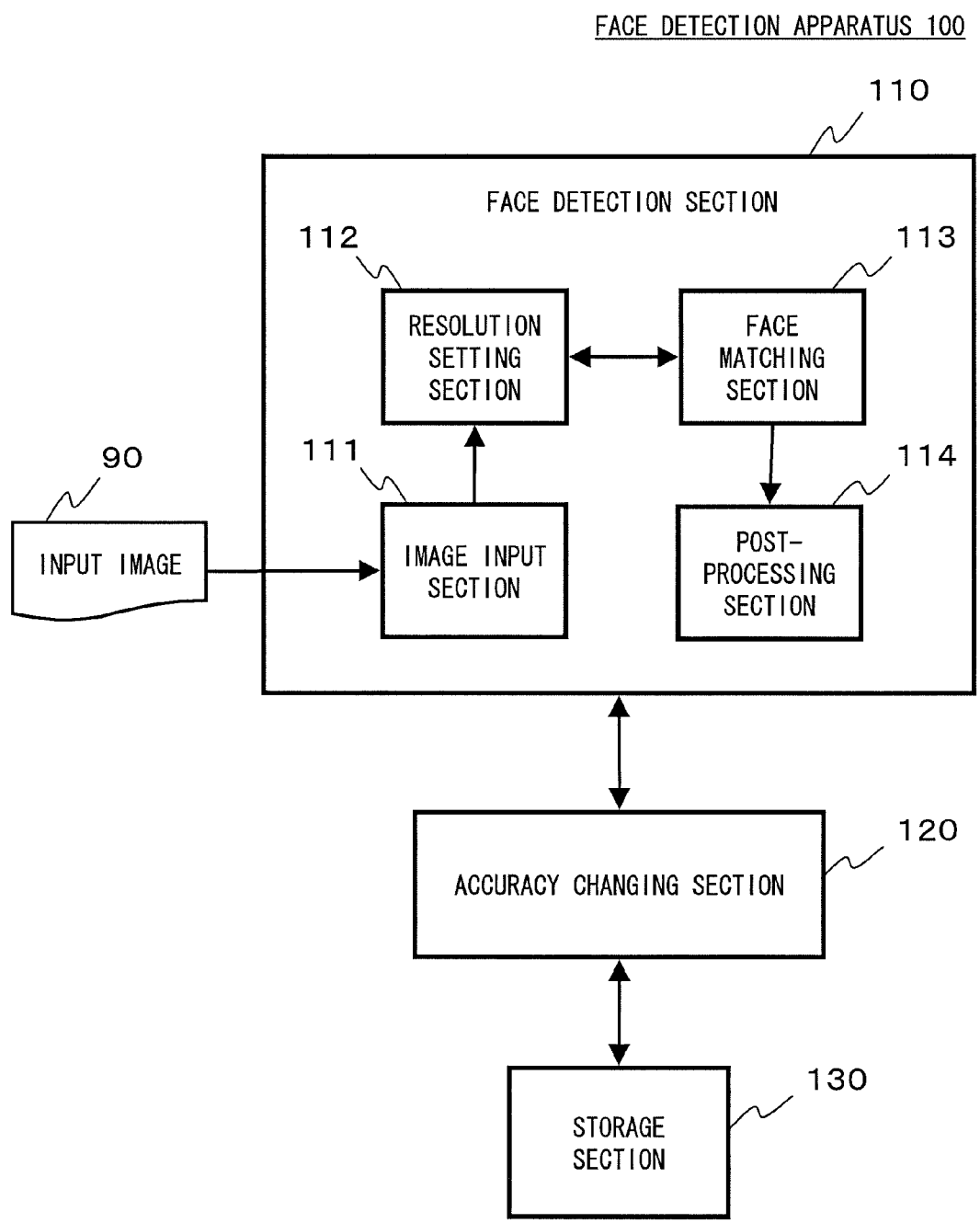
FIG. 1 is a diagram showing a face detection apparatus 100 according to an embodiment of the present invention.

Hereinafter, an embodiment of the present invention is described with reference to the accompanying drawings. FIG. 1 is a diagram showing a face detection apparatus 100 according to the embodiment of the present invention. In FIG. 1, the face detection apparatus 100 includes a face detection section 110, an accuracy changing section 120, and a storage section 130. The face detection section 110 includes an image input section 111, a resolution setting section 112, a face matching section 113, and a post-processing section 114.

Figure 2:
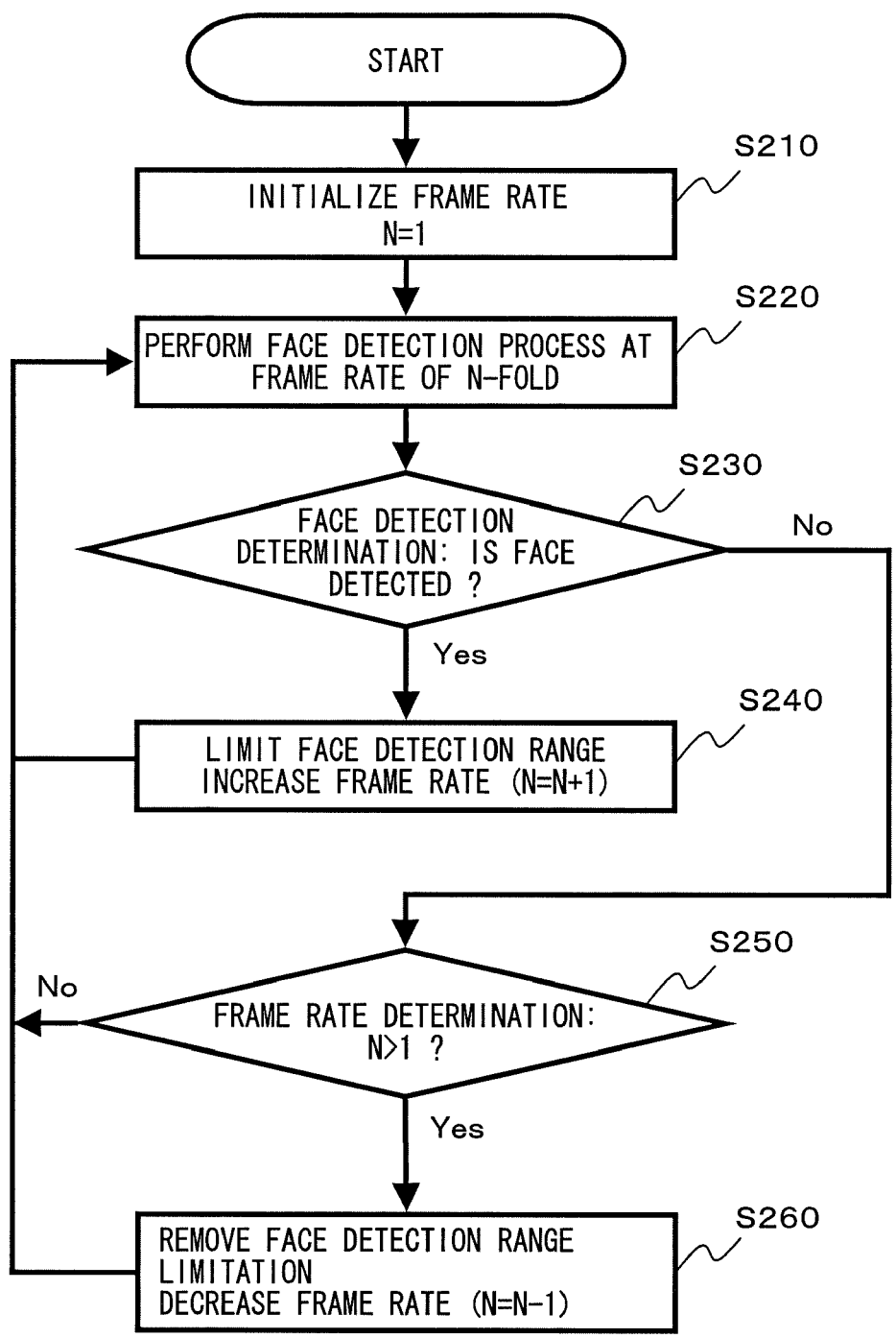
FIG. 2 is a diagram showing a face detection method 200 according to the embodiment of the present invention.

FIG. 2 is a diagram showing a face detection method 200 according to the embodiment of the present invention. In FIG. 2, the face detection method 200 includes an initialization step S210, a face detection process step S220, a face detection determination step S230, a face detection range limiting step S240, a frame rate determination step S250, and a face detection range limitation removing step S260.

Here, for ease of description, it is assumed that an image is captured at 300 frames per second, and that the face detection apparatus 100 shown in FIG. 1 is capable of processing an input image 90 having a QVGA resolution (horizontally 320 pixels×vertically 240 pixels) at a frame rate of 30 fps.

First, at the initialization step S210, the face detection section 110 initializes a parameter N, which determines the frame rate, to "1."

At the face detection process step S220, the face detection section 110 performs a face detection process at a frame rate N times greater than a reference frame rate (30 fps in the present embodiment). First, when N=1 is satisfied, the face detection process is performed on one tenth the number of frames (i.e., 30 frames in one second) of the image data captured at 300 frames per second. That is, the face detection process is performed in the ratio of one in ten frames.

Figure 3:
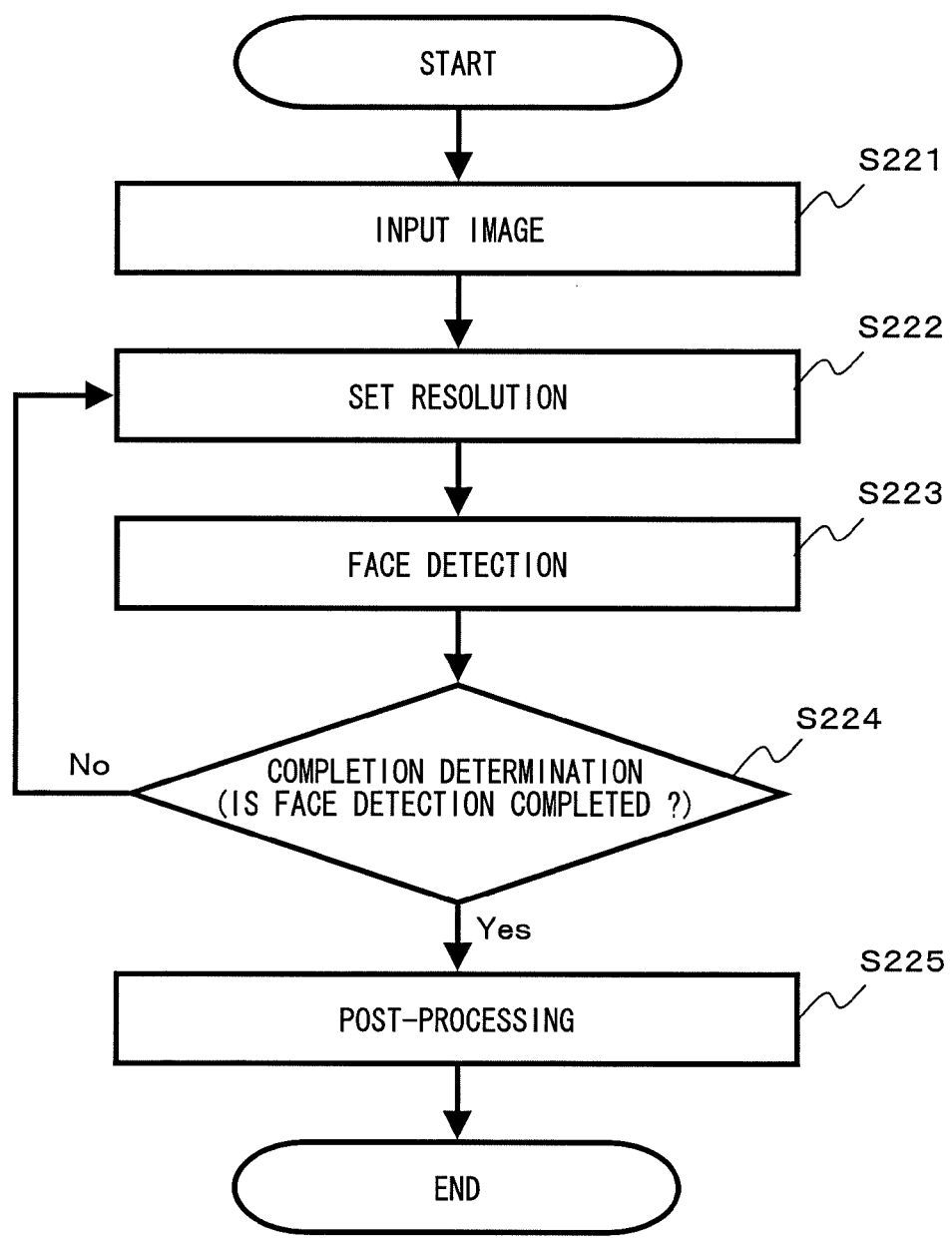
FIG. 3 is a diagram showing details of a face detection process step S220.

FIG. 3 is a diagram showing details of the face detection process step S220. In FIG. 3, the face detection process step S220 includes an image input step S221, a resolution setting step S222, a face detection step S223, a completion determination step S224, and a post-processing step S225. Note that, in the present embodiment, the size and/or position of a face contained in the input image 90 cannot be determined in advance. For this reason, firstly, the face detection process is performed with the face detection throughput per frame, which has been predetermined in advance.

At the image input step S221, the image input section 111 loads the input image 90 to be the target of the face detection process.

At the resolution setting step S222, the resolution setting section 112 generates, based on the input image 90, images having different resolutions in accordance with predetermined resolutions that have been set in advance. Specifically, the resolution setting section 112, as shown in FIG. 10 and FIG. 11, reduces the input image 90 having the QVGA resolution by 20% in stepwise fashion, thereby generating images 91, 92, 93 . . . having the respective resolutions. Note that, in the present embodiment, the resolution setting section 112 generates images to be the target of the face detection process in order from an image having a small resolution (the resolution ID=11) towards an image having a large resolution (the resolution ID=0).

At the face detection step S223, the face matching section 113 matches a prepared face template to the images to be the target of the face detection process, generated by the resolution setting section 112 at the resolution setting step S222. Specifically, in the order from the image having the small resolution (the resolution ID=11) towards the image having the large resolution (the resolution ID=0), the face matching section 113 clips a portion of each of the generated images to be the target of the face detection process, and matches the clipped images with the prepared face template. Note that, as described with reference to FIG. 11, the present embodiment uses a face template having horizontally 20 pixels×vertically 20 pixels.

Note that, the prepared face template includes, for example, frontal, left-rotated, right-rotated, left-tilted, right-tilted, downwardly-rotated, or upwardly-rotated faces. Concerning face orientations other than the frontal face, detailed angles of inclination of the faces may further be defined.

The number of face templates to be prepared may be a single one or a plurality, and the number of face templates used for matching may also be a single one or a plurality.

Further, when the face matching section 113 matches the prepared face template to the image to be the target of the face detection process as described above, thus indicating a region contained in the image is likely a face, the face matching section 113 acquires information indicating coordinates of the detected face, the face orientation, and the like. The information to be acquired, indicating the coordinates of the face, may be, for example, coordinates of the upper-left edge or the center coordinates, of the face area (horizontally 20 pixels×vertically 20 pixels) to which the face template is matched. The information to be acquired, indicating the face orientation is information indicating the orientation of the face contained in the face template with which the matching is performed.

At the completion determination step S224, the face detection section 110 determines whether an image is the final image among the images to be the target of the face detection process, which are sequentially generated by the resolution setting section 112 at the resolution setting step S222. Here, when the image to be the target of the face detection process does not have the largest resolution (the resolution ID=0) (No at the completion determination step S224), the resolution setting step S222, the face detection step S223, and the completion determination step S224 are repeated. On the other hand, when the image to be the target of the face detection process has the largest resolution (the resolution ID=0) (Yes at the completion determination step S224), the process proceeds to the post-processing step S225.

Note that, in the present embodiment, the face matching section 113 matches the prepared face template to the images in order from the image having the small resolution (the resolution ID=11) towards the image having the large resolution (the resolution ID=0), but this order should not be deemed restrictive. For example, the face matching section 113 may match the prepared face template to the target images in order from the image having the large resolution (the resolution ID=0) towards the image having the small resolution (the resolution ID=11). In this case, the face detection section 110 determines, at the completion determination step S224, whether the image to be the target of the face detection process has the smallest resolution (the resolution ID=11). The resolution ID at which the detection starts and the resolution ID at which the detection ends, with respect to the images to be the target of the face detection process, may optionally be set. For example, the images having the resolution ID=3 through 8 are sequentially set as the targets of the face detection process, and are matched with the prepared face template.

Lastly, at the post-processing step S225, the post-processing section 114 integrates the regions that are likely faces, which are detected by the face matching section 113 at the face detection step S223, and outputs the end result of the face detection. Specifically, when a plurality of regions, which are likely faces, are concentrated adjacent to each other, the post-processing section 114 integrates the plurality of regions which are likely faces to finally deem the integrated regions as a detected face.

Note that, information that the post-processing section 114 finally deems the integrated regions as the detected face is information indicating coordinates of the plurality of regions which are likely faces, an average value of the sizes of the faces, and a face orientation which is most contained in the plurality of regions, which are likely faces, that are detected by the face matching section 113 and integrated.

On the other hand, when the region, which is likely a face, detected by the face matching section 113 does not have, in its vicinity, a plurality of regions which are likely faces, that is, when the region, which is likely a face, detected by the face matching section 113 is solely detected, the region, which is likely a face, detected by the face matching section 113 may not be determined as a face.

So far, the prepared face template has been matched to the images to be the target of the face detection process, in their entire ranges, in the order from the image having the small resolution (the resolution ID=11) towards the image having the large resolution (the resolution ID=0) that are generated based on the input image 90, because the size and/or position of the face contained in the input image 90 cannot be determined in advance.

Next, at the face detection determination step S230, the accuracy changing section 120 determines whether a face is detected at the aforementioned face detection process step S220. The following will describe processes to be performed when the face is detected (Yes at the face detection determination step S230).

At the face detection range limiting step S240, the accuracy changing section 120 limits a face detection range and increments the parameter N (N=N+1) to increase the frame rate.

Figure 4:
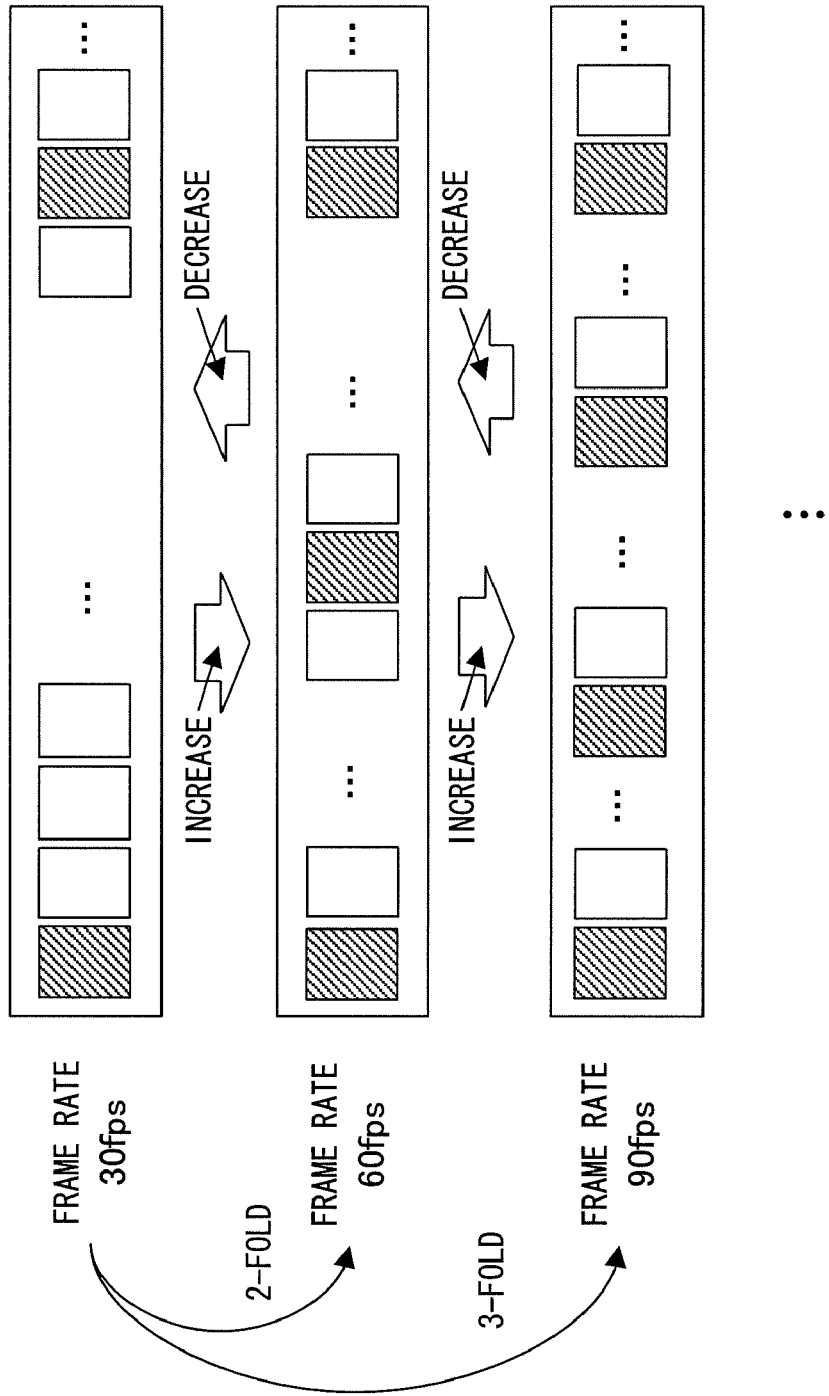
FIG. 4 is a diagram showing the change in frame rate in stepwise fashion.

Specifically, the accuracy changing section 120 changes the frame rate from 30 fps to 60 fps by changing N=1 (initial value) to N=2. FIG. 4 is a diagram showing how the frame rate changes in stepwise fashion. In FIG. 4, frames indicated by hatched portions are the target frames to be subjected to the face detection processing. At the face detection range limiting step S240, the accuracy changing section 120 changes the frame rate from 30 fps to 60 fps by changing the parameter N from "1" to "2." That is, the face detection process in the ratio of one in ten frames is changed to the face detection process in the ratio of one in five frames.

Figure 5:
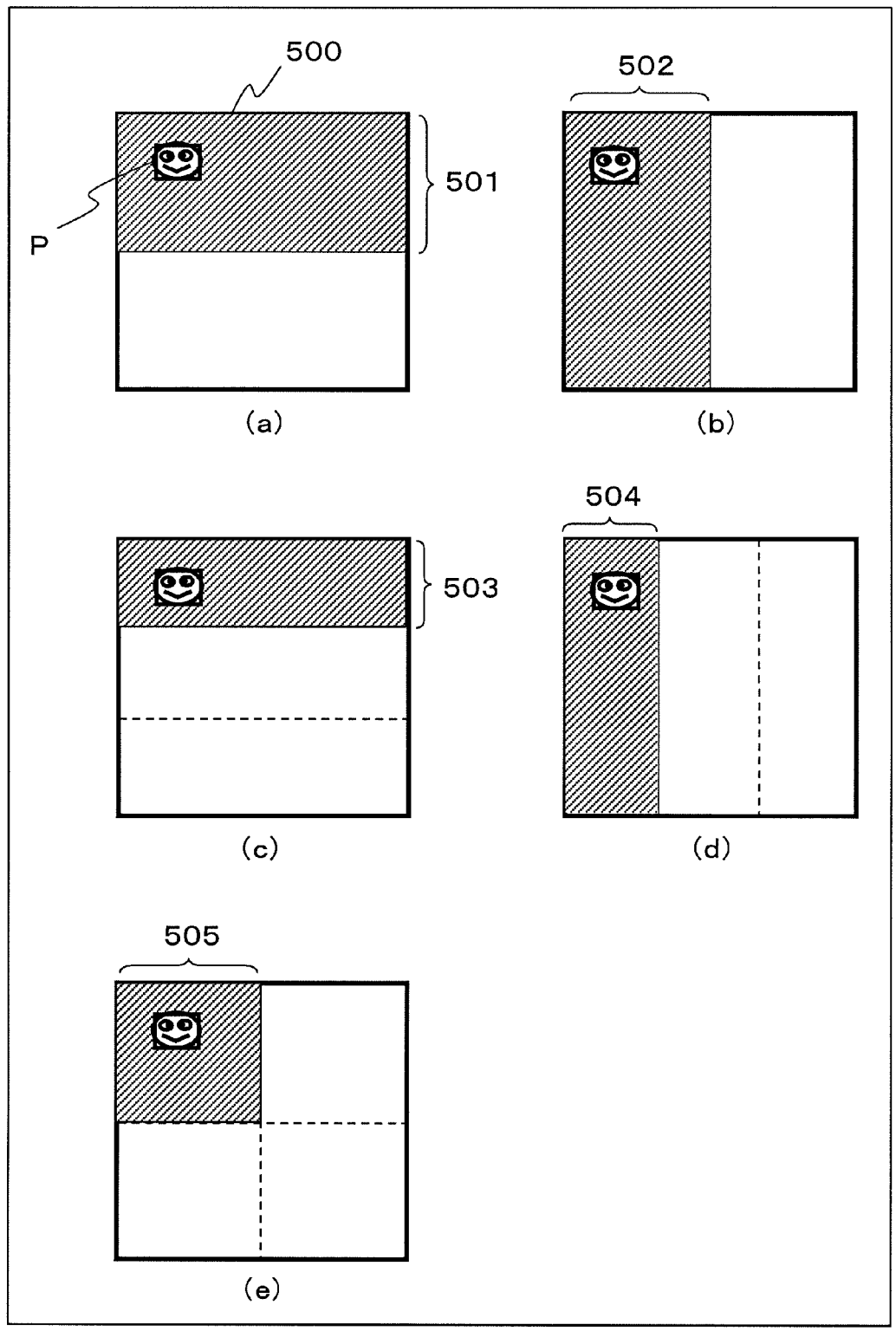
FIG. 5 is a diagram showing a method of limiting a face detection range.

Simultaneously, the accuracy changing section 120 limits the face detection range to one-half thereof so as to reduce the face detection throughput per frame to one-half thereof. FIG. 5 is a diagram showing a method of limiting the face detection range. At the face detection process step S220, when a position P at which the face has been detected by the face detection section 110 is present in the upper area of a screen 500, the face detection range is limited to an upper area 501 of the screen 500 ((a) of FIG. 5). Alternatively, when the face detection range is limited to one-half thereof, the face detection range may be limited to, for example, a left area 502 of the screen 500 ((b) of FIG. 5). Moreover, as long as the face detection range is equivalent to one-half of the entire area of the screen 500, the face detection range can be set as a rectangular area or a circular area (not shown), in the vicinity of the center of the screen 500. Here, the position P at which the face has been detected by the face detection section 110 must be contained in an area limited by the face detection range, but information pertaining to the position P can be obtained based on the information indicative of the coordinates of the face, which is acquired at the face detection process step S220. When faces are detected, dispersing across the entire screen 500, an area that contains a largest face of the detected faces is given a highest priority to be the area limited by the face detection range.

When a face is thus detected at the face detection process step S220 (Yes at the face detection determination step S230), the accuracy changing section 120 changes the conditions of the face detection process so as to double the frame rate, and simultaneously limit the face detection range to one-half thereof at the face detection range limiting step S240. Then, the process returns to the face detection process step S220, and the face detection section 110 executes the face detection process step S220 shown in FIG. 3 under such new conditions.

When a face is detected again at the face detection process step S220 (Yes at the face detection determination step S230) under the conditions where N=2 is satisfied and where the face detection range is limited to one-half thereof, the accuracy changing section 120 sets N=3 to set 90 fps to the frame rate at the face detection range limiting step S240, thereby limiting the face detection range to one-third thereof. Specifically, the accuracy changing section 120 changes the frame rate from 60 fps to 90 fps as shown in FIG. 4, and, simultaneously, limits the face detection range to an upper area 503 ((c) of FIG. 5) or to a left area 504 ((d) of FIG. 5), of the screen 500, as shown in FIG. 5. Then, the process returns to the face detection process step S220, and the face detection section 110 executes the face detection process step S220 shown in FIG. 3 under the further new conditions. Alternatively, the accuracy changing section 120 sets N=4 so as to change the frame rate to 120 fps, and limit the face detection range to an upper-left area 505 of the screen 500 ((e) of FIG. 5), as shown in FIG. 5. Note that, when a face is thus detected at the face detection process step S220 (Yes at the face detection determination step S230), the accuracy changing section 120 increments the parameter N at the face detection range limiting step S240, but N=10 is an upper limit. The upper limit of N depends on the input frame rate. The upper limit here is N=10 which is equivalent to the input frame rate. When a face is detected under such conditions (Yes at the face detection determination step S230), the parameter N is not incremented and the process returns to the face detection process step S220 (not shown).

On the other hand, the following will describe processes to be performed when no face is detected (No at the face detection determination step S230).

At the frame rate determination step S250, the accuracy changing section 120 determines whether N>1 is satisfied, with reference to a current value of the parameter N. When N>1 is not satisfied (No at the frame rate determination step S250), the process returns to the face detection process step S220, and the face detection section 110 executes the face detection process step S220 shown in FIG. 3 under the current conditions of the face detection process. Specifically, the face detection section 110 matches the prepared face template to the images to be the target of the face detection process, in their entire range, at the frame rate of 30 fps corresponding to the initial state (N=1), in the order from the image having the small resolution (the resolution ID=11) towards the image having the large resolution (the resolution ID=0), which images are generated based on the input image 90.

When N>1 is satisfied (Yes at the frame rate determination step S250), the process proceeds to the face detection range limitation removing step S260.

At the face detection range limitation removing step S260, the accuracy changing section 120 removes the limitation of the face detection range and decrements the parameter N (N=N−1) to reduce the frame rate.

Specifically, for example, when N=2 is satisfied, the accuracy changing section 120 changes the frame rate from 60 fps to 30 fps by changing the parameter N from "2" to "1." That is, as shown in FIG. 4, the face detection process in the ratio of one in five frames is changed to the face detection process in the ratio of one in ten frames.

Simultaneously, the accuracy changing section 120 removes the limitation that limits the face detection range to one-half thereof. As shown in FIG. 5, when the face detection range is limited to, for example, the upper area 501 of the screen 500 ((a) of FIG. 5), the accuracy changing section 120 changes the detection range to the entire area of the screen 500.

When no face is thus detected at the face detection process step S220 (No at the face detection determination step S230), the accuracy changing section 120 sets the conditions of the face detection process so as to halve the frame rate, and, simultaneously, remove the limitation of the face detection range that has limited the face detection range to one-half thereof at the face detection range limitation removing step S260. Subsequently, the process returns to the face detection process step S220, and the face detection section 110 executes the face detection process step S220 shown in FIG. 3 under such new conditions (the conditions of the previous face detection process).

Note that, when no face is detected at the face detection process step S220, the face detection section 110 executes the face detection process step S220 shown in FIG. 3 under the conditions of the previous face detection process, as described above. Accordingly, the face detection apparatus 100 stores the changes in the conditions of the face detection process in the storage section 130.

FIG. 6 is a diagram showing accuracy change history in the face detection process. In FIG. 6, the storage section 130 stores the changes in the conditions of the face detection process as the accuracy change history. For example, when the seventh face detection process is executed, then if no face is detected (No at the face detection determination step S230), the accuracy changing section 120 changes the conditions of the face detection process to the ones of the previous face detection process, i.e., to the face detection conditions at the sixth face detection process. Then, the face detection section 110 executes the eighth face detection process under the face detection conditions at the sixth face detection process, which have been changed by the accuracy changing section 120.

As described above, when a face is detected at the face detection process step S220 (Yes at the face detection determination step S230), the position and/or size of the detected face does not change dramatically, and therefore, there is little influence caused by limiting the face detection range. The frame rate, on the other hand, is increased to enhance the accuracy of the face detection (the face detection range limiting step S240).

In contrast, when no face is detected at the face detection process step S220 (No at the face detection determination step S230), the face detection range is expanded to enhance the accuracy of the face detection (the face detection range limitation removing step S260). Here, the frame rate is reduced because the face detection throughput increases caused by expanding the face detection range. That is, when the sight of a face is lost, it is difficult to forecast the position of a face thereafter, and therefore, the face detection process is performed spending sufficient process time per frame in order to emerge, as soon as possible, from the state where no face is detected.

In other words, when a face is detected, the face detection throughput per frame is reduced to thin the process in a space-axis direction. In contrast, when no face is detected, the frame rate is reduced to thin the process in a time-axis direction, so as to realize the face detection with high accuracy, while keeping constant the face detection throughput in the face detection apparatus 100.

As described above, the face detection apparatus 100 and the face detection method 200, according to the embodiment of the present invention, allow detection of a face area contained in the image data with low power consumption and high efficiency by reducing the requisite throughput for the face detection process while maintaining the accuracy of the face detection, regardless of the shooting scene and the frame rate.

Note that, there is a method of thinning the process in the time-axis direction, which simply slows the frame rate in detecting a face. As described in the present embodiment, instead of performing the face detection process on all frames of the image data, for example, the face detection process in the ratio of one in five frames may be changed to the face detection process in the ratio of one in ten frames. Consequently, the face detection throughput can be reduced. This method is effective when a subject remains stationary.

Also, as a method of thinning the process in the time-axis direction, the target of the face detection process may be limited by picture type. Specifically, image data captured by a digital camera or the like is, in many cases, compressed when stored. In general, image data is compressed specifying a picture type such as I picture, P picture, B picture, or the like. In this case, when the target of the face detection process is specified to only I pictures, it is possible to significantly reduce the throughput of the entire face detection process. Note that, the target of the face detection process should not be limited to I pictures, and may be limited to P pictures or B pictures, or the combination of any of the three types of pictures.

FIG. 7A is a diagram showing reduction rates of the face detection throughput, and priorities, with respect to the method of thinning the process in the time-axis direction. In FIG. 7A, the reduction rates of the face detection throughput and the priorities are set in advance. For example, in order to change the frame rate from 2-fold to 1-fold, the face detection process in the ratio of one in five frames may be changed to the face detection process in the ratio of one in ten frames, as described in the present embodiment, by using the process limitation to "regular interval" having "priority"=1. Alternatively, the process may be thinned in the time-axis direction by combining, for example, the process limitation to "regular interval" and "picture type" limited to "I picture", based on a desired frame rate and a previously-calculated reduction rate of the face detection throughput.

Note that, in the present embodiment, as a method of thinning the process in the space-axis direction, the face detection range is limited as shown in FIG. 5, which, however, should not be deemed restrictive. For example, the orientation of a face to be detected may be limited. Specifically, when the face detection process is performed by matching the face templates having frontal, left-rotated, and right-rotated faces, to the image to be the target of the face detection process, the face detection throughput can be reduced, if the process is changed so as to perform the matching using the face template having the frontal face only. This method is effective when the face orientation of a subject is limited to some extent.

Also, as the method of thinning the process in the space-axis direction, the size of a face to be detected may be limited. Specifically, in the example shown in FIG. 10 and FIG. 11, by reducing the input image 90 by a predetermined reduction rate in stepwise fashion, images 91, 92, 93 . . . are generated having different resolutions, based on the input image 90. Then, in the order from the image having the greatest reduction rate (resolution ID=11) toward the image having the small reduction rate (resolution ID=0), the images to be the target of the face detection process are selected, and a portion of each of the selected images is clipped and matched with the prepared face template. However, instead of generating the images having the different resolutions of 12 phases, only images having different resolutions of 6 phases may be generated as the targets of the face detection process, by limiting the resolutions to ones having the resolution IDs=6 and above. This method is effective when the size of a face of the subject is limited to some extent.

Note that, if small faces are allowed to be excluded from the sizes of the faces to be detected, by limiting the target of the face detection process to large faces, i.e., if images having small reduction rates (for example, the resolution IDs=0, 1) are allowed to be excluded from the target of the face detection process, it is possible to significantly reduce the throughput of the entire face detection process.

FIG. 7B is a diagram showing the reduction rates of the face detection throughput and the priorities, with respect to the method of thinning the process in the space-axis direction. In FIG. 7B, the reduction rates of the face detection throughput and the priorities are set in advance. For example, when the frame rate becomes 2-fold, the face detection range is limited to the upper area 501 of the screen 500 ((a) of FIG. 5) by using "area" limited to "upper/lower" having "priority"=1, and therefore, the process may be set so as to be thinned in the space-axis direction. When the frame rate becomes 3-fold, an image to be the target of the face detection process may be set so as to be matched with only the frontal face template, by using "face orientation" limited to "frontal" having "priority"=2. When the frame rate further becomes greater, the face detection throughput may be kept constant by combining, for example, "area" limited to "upper/lower" and "face orientation" limited to "frontal", based on the reduction rate of the face detection throughput.

Note that, in the present embodiment, the face template having horizontally 20 pixels×vertically 20 pixels is used and, as shown in FIG. 10 and FIG. 11, the input image 90 having the QVGA resolution is reduced by 20% in stepwise fashion to generate images 91, 92, 93 . . . having respective resolutions, which, however, should not be deemed restrictive. For example, the face detection process may be performed enlarging the input image 90 by 20% in stepwise fashion.

Note that, in the present embodiment, the size of the face template is kept constant while the image to be matched with the template is reduced. However, the size of the image to be matched with the template may be kept constant while the size of the face template may be reduced (or enlarged).

Figure 8:
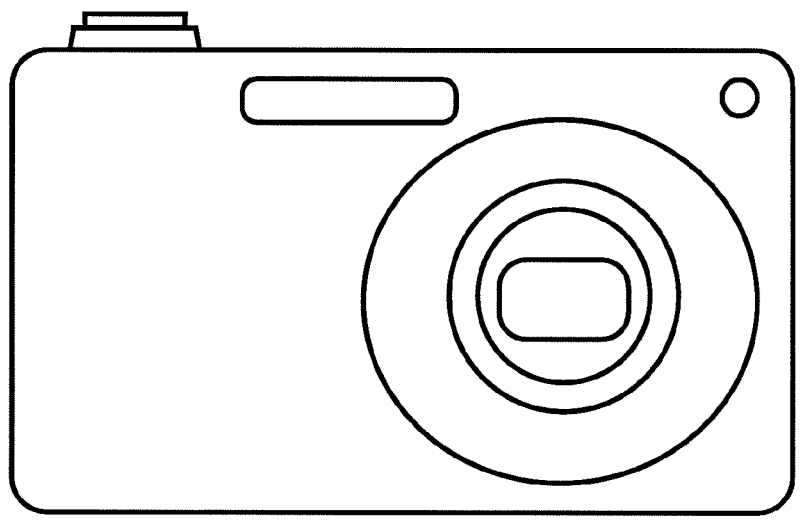
FIG. 8 is a diagram showing a digital still camera 800.
Figure 9:
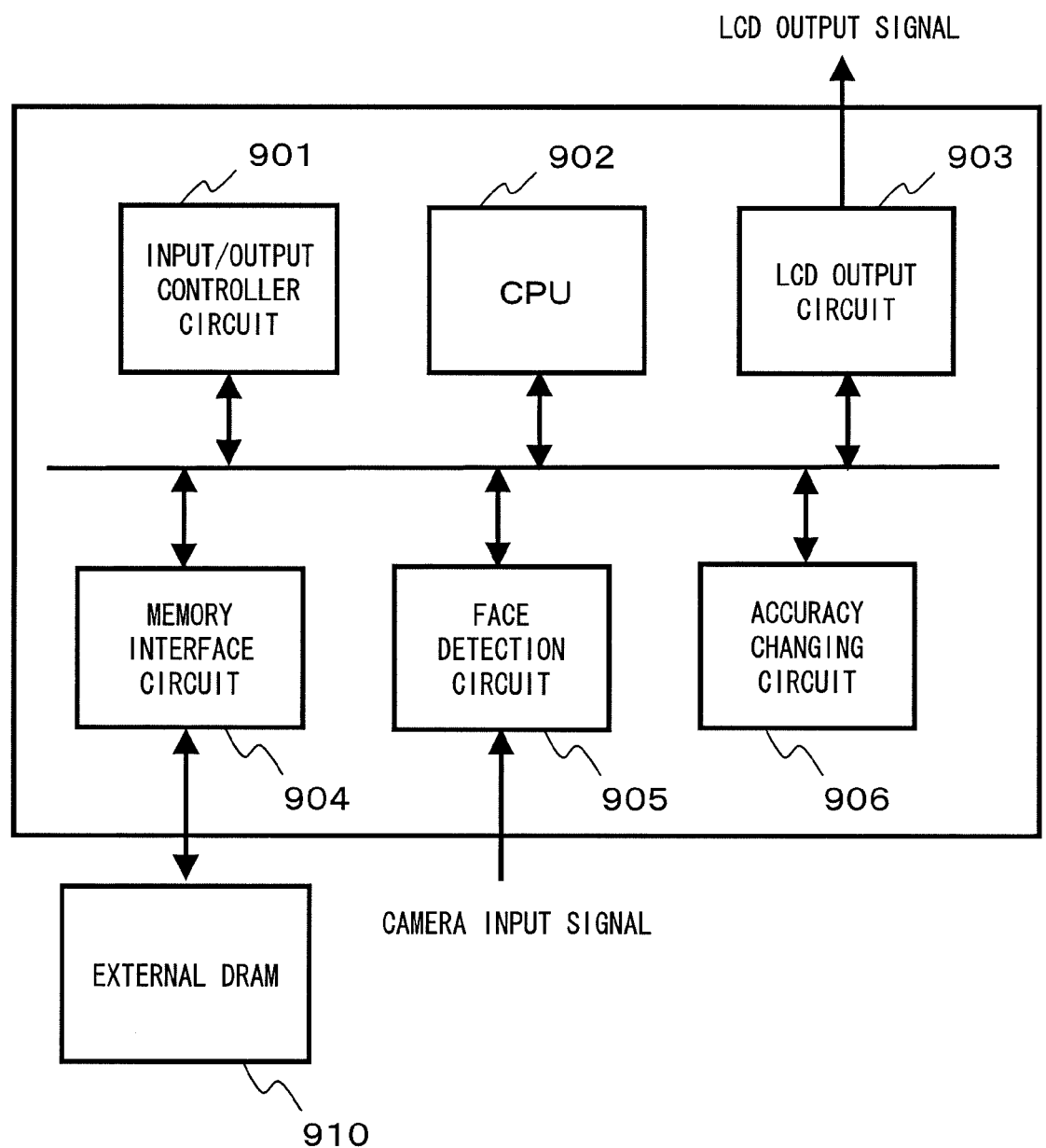
FIG. 9 is a diagram showing a digital-still-camera integrated circuit 900 mounted in the camera of FIG. 8.

FIG. 8 is a diagram showing a digital still camera 800. FIG. 9 is a diagram showing a digital-still-camera integrated circuit 900 mounted in the camera of FIG. 8. In FIG. 9, the digital-still-camera integrated circuit 900 includes an I/O (input/output) controller circuit 901, a CPU (Central Processing Unit) 902, an LCD (Liquid Crystal Display) output circuit 903, a memory interface circuit 904, a face detection circuit 905, and an accuracy changing circuit 906. In addition, the digital-still-camera integrated circuit 900 is connected with an external DRAM (Dynamic Random Access Memory) 910.

Here, the I/O controller circuit 901 controls external I/O such as a USB (Universal Serial Bus) or an SD (Secure Digital) card. The CPU 902 controls the entire integrated circuit 900. The LCD output circuit 903 controls output to an LCD panel. The memory interface circuit 904 controls input from the external DRAM 910 and output to the external DRAM 910. The face detection circuit 905 and the accuracy changing circuit 906 detect a face while performing exposure correction on the input image, enlarging/reducing the input image, and moreover, changing the conditions of the face detection process.

The image input from an external camera is stored in the external DRAM 910 via the face detection circuit 905. At this time, the resolution of the input image is converted such that the face detection circuit 905 is able to perform the process with. The face detection circuit 905 loads image data for the face detection, which is to be stored in the external DRAM 910, and notifies the CPU 902 of the detection result.

A QVGA resolution image, which is an input to be subjected to the face detection, is stored in the external DRAM 910. The face detection circuit 905 generates reduced (enlarged) images having different resolutions in accordance with the preset resolutions. The reduced (enlarged) images that are generated may be stored in the external DRAM 910, or be held in an internal memory (not shown) of the face detection circuit 905 or of the accuracy changing circuit 906. Then, the face detection circuit 905 and the accuracy changing circuit 906 execute the face detection process as shown in FIG. 2 and FIG. 3. Note that, preferably, steps in the face detection process where tuning is required, such as determination of the resolutions and check on the detected face coordinates, are carried out in the CPU 902.

Note that, each configuration described above may be realized as an LSI (Large Scale Integration) which is an integrated circuit. These configurations may be formed into one chip, or a part or the whole of the configurations may be included in one chip. Although the LSI is mentioned herein, it may also be called an IC (Integrated Circuit), a system LSI, a super LSI, or an ultra LSI, depending on the difference in the degree of integration. Furthermore, the method for circuit-integration is not limited to the LSI, and may be realized through circuit-integration of a dedicated circuit or a general-purpose processor. Furthermore, an FPGA (Field Programmable Gate Array) that is capable of programming after manufacturing the LSI or a reconfigurable processor that is capable of reconstituting connections and configurations of a circuit cell within the LSI, may be used. Alternatively, arithmetic processing of these function blocks may be performed by using, for example, a DSP, a CPU (Central Processing Unit), and the like. Furthermore, these processing steps may be recorded as a program on a recording medium, and may be executed.

Additionally, if a technology for circuit-integration which replaces the LSI is introduced as a result of the advance in semiconductor technology or another technology derived therefrom, naturally, such technology may be used for integrating the functional blocks. One such possibility is an application of biotechnology.

INDUSTRIAL APPLICABILITY

The face detection apparatus according to the present invention is useful as technology or the like that obtains a desired detection result at a high frame rate from equipment which has different requirements, such as a digital still camera, a digital video camera, or an observation camera, and, furthermore, is useful as technology or the like that obtains the desired detection result at low power consumption and at a high speed.

REFERENCE SIGNS LIST 90 input image
91, 92, 93 image corresponding to a resolution
100 face detection apparatus
110 face detection section
111 image input section
112 resolution setting section
113 face matching section
114 post-processing section
120 accuracy changing section
130 storage section
200 face detection method
500 screen
501, 503 upper area
502, 504 left area
505 upper-left area
800 digital still camera
900 digital-still-camera integrated circuit
901 I/O controller circuit
902 CPU
903 LCD output circuit
904 memory interface circuit
905 face detection circuit
906 accuracy changing circuit
910 external DRAM
S210 initialization step
S220 face detection process step
S221 image input step
S222 resolution setting step
S223 face detection step
S224 completion determination step
S225 post-processing step
S230 face detection determination step
S240 face detection range limiting step
S250 frame rate determination step
S260 face detection range limitation removing step

The invention claimed is:

1. A face detection apparatus for detecting a face contained in an input image comprising:
a face detection section for detecting a face contained in the input image, based on a predetermined frame rate and face detection throughput per frame;
an accuracy changing section for changing, when no face is detected by the face detection section, an accuracy in detecting a face by the face detection section by reducing the frame rate; and
a storage section for storing, when a face is detected by the face detection section, as accuracy change history, the accuracy, which is changed by the accuracy changing section, in detecting a face by the face detection section, wherein
when no face is detected by the face detection section, the accuracy changing section changes the accuracy in detecting a face by the face detection section based on the accuracy change history stored in the storage section.

2. The face detection apparatus according to claim 1, wherein when a face is detected by the face detection section, the accuracy changing section changes the accuracy in detecting a face by the face detection section by reducing the face detection throughput per frame.

3. The face detection apparatus according to claim 2, wherein when a face is detected by the face detection section, a face detection range to be a target of the face detection is limited in the frame to be the target of the face detection by the face detection section.

4. The face detection apparatus according to claim 2, wherein when a face is detected by the face detection section, a size of a face to be a target of the face detection is limited in the frame to be the target of the face detection by the face detection section.

5. The face detection apparatus according to claim 2, wherein when a face is detected by the face detection section, an orientation of a face to be a target of the face detection process is limited in the frame to be the target of the face detection by the face detection section.

6. The face detection apparatus according to claim 2, wherein when a face is detected by the face detection section, a target of the face detection is limited in accordance with a preset priority, in the frame to be the target of the face detection by the face detection section.

7. The face detection apparatus according to claim 1, wherein when no face is detected by the face detection section, the accuracy changing section changes the accuracy in detecting a face by the face detection section based on the accuracy change history stored in the storage section, to an accuracy at which a face has been most recently detected by the face detection section.

8. The face detection apparatus according to claim 1, wherein
when no face is detected by the face detection section, the accuracy changing section reduces the frame rate and increases the face detection throughput per frame, and
when a face is detected by the face detection section, the accuracy changing section reduces the face detection throughput per frame and increases the frame rate.

9. The face detection apparatus according to claim 8, wherein the accuracy changing section changes the accuracy in detecting a face by the face detection section so as to keep constant the throughput of the entire face detection by the face detection section.

10. The face detection apparatus according to claim 1, wherein when no face is detected by the face detection section, a frame to be a target of the face detection by the face detection section is selected at a regular interval from among all frames of the input image.

11. The face detection apparatus according to claim 1, wherein when no face is detected by the face detection section, a frame to be a target of the face detection by the face detection section is a frame having a specific picture type selected from among all frames of the input image.

12. The face detection apparatus according to claim 1, wherein when no face is detected by the face detection section, a frame to be a target of the face detection by the face detection section is selected in accordance with a preset priority order.

13. A face detection method for detecting a face contained in an input image, which is executed by a face detection apparatus, the face detection method comprising:
 a face detection step for detecting a face contained in the input image, based on a predetermined frame rate and face detection throughput per frame;
 an accuracy changing step for changing, when no face is detected by the face detection step, an accuracy in detecting a face by the face detection step by reducing the frame rate; and
 a storing step for storing, when a face is detected by the face detection section, as accuracy change history, the accuracy, which is changed by the accuracy changing section, in detecting a face by the face detection step, wherein
 when no face is detected by the face detection step, the accuracy changing step changes the accuracy in detecting a face by the face detection step based on the accuracy change history stored in the storing step.

14. An integrated circuit used in a face detection apparatus for detecting a face contained in an input image, comprising:
 a face detection section for detecting a face contained in the input image, based on a predetermined frame rate and face detection throughput per frame;
 an accuracy changing section for changing, when no face is detected by the face detection section, an accuracy in detecting a face by the face detection section by reducing the frame rate; and
 a storage section for storing, when a face is detected by the face detection section, as accuracy change history, the accuracy, which is changed by the accuracy changing section, in detecting a face by the face detection section, wherein
 when no face is detected by the face detection section, the accuracy changing section changes the accuracy in detecting a face by the face detection section based on the accuracy change history stored in the storage section.

* * * * *